(No Model.)
N. BRAGDON.
DEVICE FOR LIGHTING AND EXTINGUISHING LANTERNS.
No. 273,342. Patented Mar. 6, 1883.
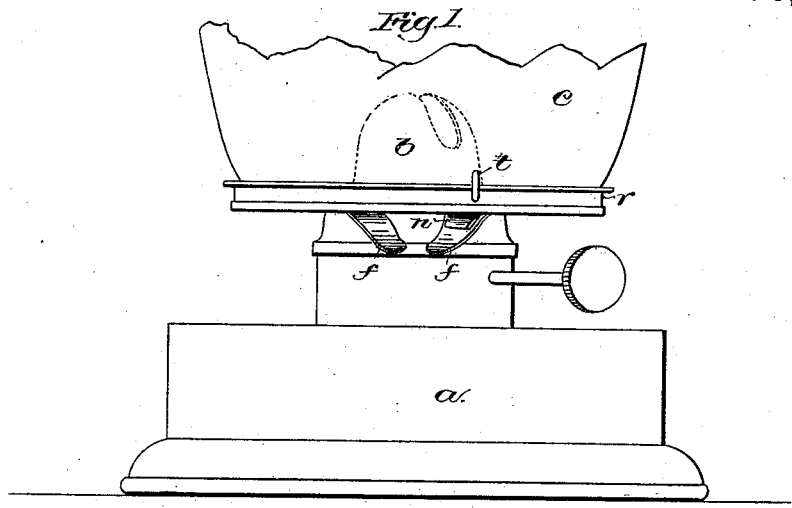
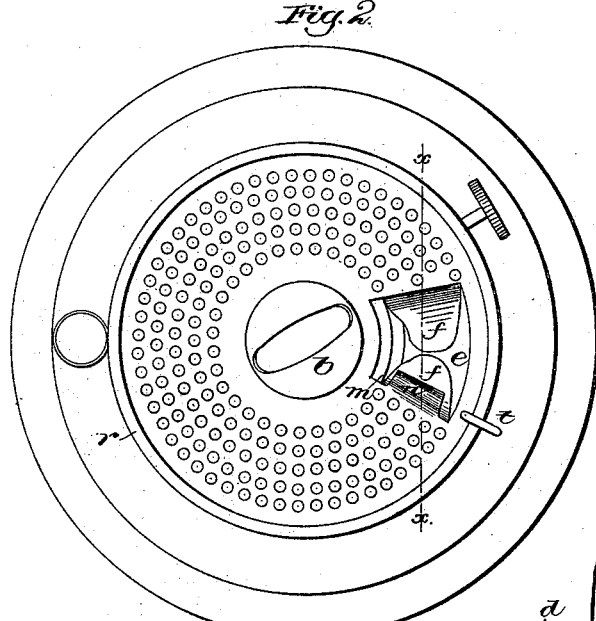
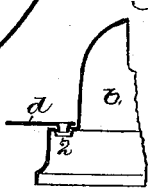
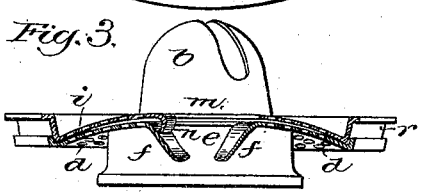
Witnesses:
John F. C. Preinkert,
Fred A. Powell.
Inventor:
Nathaniel Bragdon
by Crosby & Gregory
attys.

UNITED STATES PATENT OFFICE.

NATHANIEL BRAGDON, OF DANVERS, MASSACHUSETTS.

DEVICE FOR LIGHTING AND EXTINGUISHING LANTERNS.

SPECIFICATION forming part of Letters Patent No. 273,342, dated March 6, 1883.

Application filed December 8, 1882. (No model.)

*To all whom it may concern:*

Be it known that I, NATHANIEL BRAGDON, of Danvers, county of Essex, State of Massachusetts, have invented an Improvement in Devices for Lighting and Extinguishing Lanterns, of which the following description, in connection with the accompanying drawings, is a specification, like letters on the drawings representing like parts.

My invention, relating to lanterns, has for its object to provide means for readily lighting and extinguishing the lantern without removing its glass globe or chimney.

The invention is shown embodied in a tubular lantern, or one in which a tubular frame-work extends up from the oil-receptacle, and contains within it the glass globe or chimney inclosing the burner and protecting the flame from air-currents. The lower end of the said globe rests in a perforated plate, through which the air for combustion is supplied to the flame, which is above the said plate, and the upper end of the globe is usually connected with the upper portion of the lantern frame-work by a spring-clamp of some form. The perforated plates have usually been provided with a perforation of sufficient size to insert a match for lighting; but the said opening has to be very small to prevent air-currents from entering and disturbing the flame, and this is consequently a very inconvenient method of lighting the lantern. Moreover, when the lanterns have to be extinguished, it is necessary to remove the heated globe and subsequently replace it, usually in the dark, after the flame has been extinguished.

My invention consists in providing the perforated plate with a large opening, preferably having downwardly-extending wings at its sides, located in a particular relation to the wick and flame, so that a slight puff of air will readily extinguish the flame, the said opening being also sufficient for the easy introduction of a match for lighting. This opening is closed while the lantern is burning by a suitable slide, preferably another perforated plate having a corresponding opening, which may be made to coincide in position with the before-mentioned opening or removed from coincidence therewith by a slight rotation of the said slide around the burner as a center. The said slide is provided with a handle for thus rotating it, and preferably, also, has a wing which serves, by its engagement with the fixed perforated plate at the sides of its opening, to limit the rotary movement of the slide, and also to assist in guiding the puff of air to extinguish the flame.

Figure 1 is a side elevation of the lower portion of a lantern embodying this invention; Fig. 2, a plan view with the globe and upper portion of the lantern removed; Fig. 3, a vertical section on line $x\ x$, Fig. 2; and Fig. 4, a sectional detail to be referred to.

The oil-receptacle $a$, burner $b$, and globe $c$, held in place around and above the burner by frame-work mounted on the receptacle $a$, are all of usual construction, the said frame-work being omitted, as it forms no part of the present invention. A perforated plate, $d$, surrounding and supported upon the crown or dome-shaped portion of the burner, closes the lower end of the globe $c$ to prevent currents of air from disturbing the flame, but admits of sufficient air passing through its perforations to maintain the proper combustion of the flame. In order to permit the insertion of a match to light the lantern, or to enable it to be easily blown out, the said plate $d$ is provided with an opening, $e$, the metal being preferably cut in two concentric arcs, and then cut across radially at an intermediate point in the said arcs and bent down to form two flaps or wings, $f$, which operate to guide a current of air toward the flame, so that a slight puff of the breath easily extinguishes it. For the best operation the opening $e$ should be located, as shown, at the side of one end of the wick, so that the puff of air passes diagonally across the flame from one end thereof. In order to insure this location, the plate $d$ is engaged with the burner, in this instance by striking up a portion of the said burner and plate, as shown at 2, Fig. 4, thus fixing the plate or preventing any rotary movement thereof relative to the burner and wick or flame. The opening $e$ has to be closed when the light is burning to protect it from being accidentally put out, and for this purpose a slide, $i$, is provided, it being shown as a perforated plate similar to the one $d$, and having a corresponding opening, $m$, with a lip or flange, $n$, at one side thereof and extending down into the opening $e$ of the fixed plate $d$. The said plate $m$ rotates freely upon the plate $d$ about the burner $b$, and it is provided with the usual peripherical flange, $r$, for receiving the globe $c$, and also with a handle or projection, $t$, for rotating it. The lip serves, by its engagement with the wings $f$ at the sides of the opening $e$ to limit the rotation of the said plate or slide $i$, when, as shown in Fig. 3, the openings of both plates coincide for lighting or extinguishing, or when, as shown in Fig. 1, the said openings do not coincide, the opening $e$ being closed or covered by the plate $i$ to keep the light burning. A slight space is left between the plates $d$ $i$, as shown in Fig. 3, so that neither plate can ever close the perforations of the other.

I am aware that lanterns and lamps have been provided with opening for the insertion of a match and means for covering the said openings, and I do not broadly claim such a device.

I claim—

1. The combination, with the burner and globe surrounding it, of the perforated plate closing the lower end of the said globe and having a large opening, and the perforated plate having a corresponding opening, it being pivoted upon the said burner and constituting a slide to close the said opening, substantially as described.

2. The perforated disk for surrounding the burner and closing the end of the globe of the lantern, the said disk having an opening provided with wings at the sides thereof, substantially as described.

3. The perforated disk engaged with the burner and provided with an opening, combined with the rotating disk or slide having a corresponding opening, and provided with a lip at one side thereof, substantially as and for the purpose set forth.

In testimony whereof I have signed my name to this specification in the presence of two subscribing witnesses.

NATHANIEL BRAGDON.

Witnesses:
JOS. P. LIVERMORE,
BERNICE J. NOYES.